US010244077B2

(12) United States Patent
Lopez et al.

(10) Patent No.: US 10,244,077 B2
(45) Date of Patent: Mar. 26, 2019

(54) ENTERPRISE SERVICE BUS SEQUENCER

(71) Applicant: HEWLETT PACKARD ENTERPRISE DEVELOPMENT LP, Houston, TX (US)

(72) Inventors: Scott Lopez, Plano, TX (US); Jeff Kalibjian, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 173 days.

(21) Appl. No.: 15/500,926

(22) PCT Filed: Jan. 28, 2015

(86) PCT No.: PCT/US2015/013189
§ 371 (c)(1),
(2) Date: Jan. 31, 2017

(87) PCT Pub. No.: WO2016/122469
PCT Pub. Date: Aug. 4, 2016

(65) Prior Publication Data
US 2017/0251075 A1    Aug. 31, 2017

(51) Int. Cl.
*G06F 15/173* (2006.01)
*H04L 29/08* (2006.01)
*H04L 29/06* (2006.01)

(52) U.S. Cl.
CPC .............. *H04L 67/32* (2013.01); *H04L 67/10* (2013.01); *H04L 67/42* (2013.01)

(58) Field of Classification Search
CPC .......... H04L 67/10; H04L 67/32; H04L 67/42
See application file for complete search history.

(56) References Cited

U.S. PATENT DOCUMENTS 8,046,195 B2   10/2011   Vecera et al.
8,112,434 B2   2/2012    Patten, Jr. et al.
(Continued)

FOREIGN PATENT DOCUMENTS

WO   WO-2014124528 A1   8/2014

OTHER PUBLICATIONS

Eduardo B. Fernandez et al., "Two Patterns for Distributed Systems: Enterprise Service Bus (ESB) and Distributed Publish/Subscribe," Sep. 26, 2011, pp. 1-15, Available at: <hillside.net/plop/2011/papers/B-31-Fernandez.pdf>.

(Continued)

*Primary Examiner* — Mohamed A Wasel
(74) *Attorney, Agent, or Firm* — Hewlett Packard Enterprise Patent Department

(57) ABSTRACT

In one example, an Enterprise Service Bus (ESB) Sequencer may receive a request token that includes a plurality of ESB requests. The request token may be parsed into a plurality of service frames. Verification confirms a) each of the plurality of ESB requests are valid and corresponding services available and b) sufficient computing resources are available to complete each of the plurality of ESB requests. For each of the service frames an ESB may be called using a requested input source and format provided in the request token for the service frame. The respective output source from the ESB is received and stored. The respective output source may be used as an input source for one or more other service frames. One or more service frame output sources as requested by the request token may be sent to a calling application.

15 Claims, 6 Drawing Sheets

(56) References Cited

U.S. PATENT DOCUMENTS

| | | | |
|---|---|---|---|
| 8,156,140 | B2 | 4/2012 | Roshen et al. |
| 8,185,916 | B2 | 5/2012 | Toussaint et al. |
| 8,200,278 | B2 | 6/2012 | Little |
| 8,321,909 | B2 | 11/2012 | Fot et al. |
| 8,364,745 | B2 | 1/2013 | Roshen |
| 8,433,746 | B2 | 4/2013 | Vecera et al. |
| 8,489,733 | B2 | 7/2013 | Vecera et al. |
| 8,570,905 | B2 | 10/2013 | Hulse et al. |
| 8,613,043 | B2 | 12/2013 | Fot et al. |
| 8,655,941 | B2 | 2/2014 | Roshen |
| 8,805,938 | B2 | 8/2014 | Yu |
| 9,098,565 | B1* | 8/2015 | Kumarjiguda .... G06F 17/30604 |
| 2007/0143447 | A1 | 6/2007 | Beckum et al. |
| 2007/0263534 | A1 | 11/2007 | Pavlick |
| 2008/0027938 | A1 | 1/2008 | Hartman |
| 2009/0019421 | A1 | 1/2009 | Barcia et al. |
| 2009/0064271 | A1* | 3/2009 | Ng .................... G06F 17/30489 726/1 |
| 2009/0089078 | A1* | 4/2009 | Bursey .................... H04W 4/70 705/300 |
| 2011/0125776 | A1 | 5/2011 | Roshen et al. |
| 2011/0131643 | A1 | 6/2011 | Lawrence et al. |
| 2013/0325789 | A1 | 12/2013 | Krishnan et al. |
| 2014/0244832 | A1* | 8/2014 | Beck ....................... G06F 9/546 709/224 |
| 2018/0129706 | A1* | 5/2018 | Li ..................... G06F 17/30483 |

OTHER PUBLICATIONS

International Search Report and Written Opinion, International Application No. PCT/US2015/013189, dated Sep. 1, 2015, pp. 1-8, KIPO.

No Magic, Inc., "Cameo SOA+TM Plugin," 2013, pp. 1-47, Version 17.0.5, Available at: <nomagic.com/files/manuals/CameoSOA+%20Plugin%20UserGuide.pdf>.

* cited by examiner

ENTERPRISE SERVICE BUS SEQUENCER

BACKGROUND

An Enterprise Service Bus (ESB) is a system that provides communications, message routing and message transformation to enterprise applications in a single, unified architecture. The ESB can distribute information across an enterprise quickly and easily. It can mask differences among underlying platforms, software architectures, and network protocols. It ensures information delivery even when some systems or networks may fail occasionally. An ESB can also re-route, log, and enrich information without requiring applications to be rewritten. An ESB may provide incremental solution implementations so all enterprise services and applications need not change immediately or all at once.

BRIEF DESCRIPTION OF THE DRAWINGS

Certain examples are described in the following detailed description and in reference to the drawings, in which.

DETAILED DESCRIPTION

An ESB itself is not a new software concept, rather it is a flexible paradigm for integrating applications, coordinating resources, and manipulating information in a stateless manner. Even so, such a flexible framework necessitates that meaningful applications require the integration of many discrete functions to deliver an end service. Such turnkey applications are typically organically developed to manage those interactions and can be quite complex, time-consuming, and difficult to build and debug as they should successfully be able to manage the service calls to the ESB and the resultant intermediate data sets returned by the ESB.

To deal with the complexity of building applications and managing services calls to the Enterprise Service Bus (ESB) and its resulting data set results, a new architectural element for ESB frameworks has been developed, which may be called an ESB Sequencer (ESBS). The ESBS can allow a set of services to be requested from the ESB at one time. The ESBS may manage all the intermediate data set products derived from each managed ESB service function call. The ESBS may propagate the various resultant data streams as necessary into the input of the next or other subsequent ESB service functions to be requested by the ESBS. This can result in a standalone mechanism for delivering end application functionality without the necessity of having to build applications to manage the service calls to the ESB and their respective returned data sets.

Rather than having to create an application to call a sequence of ESB service requests, the ESBS has been developed to accept a simple token request that may be used to serialize multiple ESB service requests to enable a set of services to be requested from the ESB at one time. The ESBS also may manage all the intermediate data set results. The benefit is that development is faster as application programming is avoided while still delivering much of the same end application functionality. The data set results from the ESB can be secured with encryption if desired and the results can be audited as needed. Verification of the ESB Request Token (ESBRT) can ensure that the proper ESB capabilities and resources are available to complete the request by the requested time specified in the ESBRT or else the ESB Request Token contents may not be executed. In fact, the ESBS concept can be abstracted onto itself. That is, another independent sequencer process can be used to manage sets of ESBS request and so on. More detail on how the ESBS operates following the description of a computing system to implement the ESBS.

Figure 1:
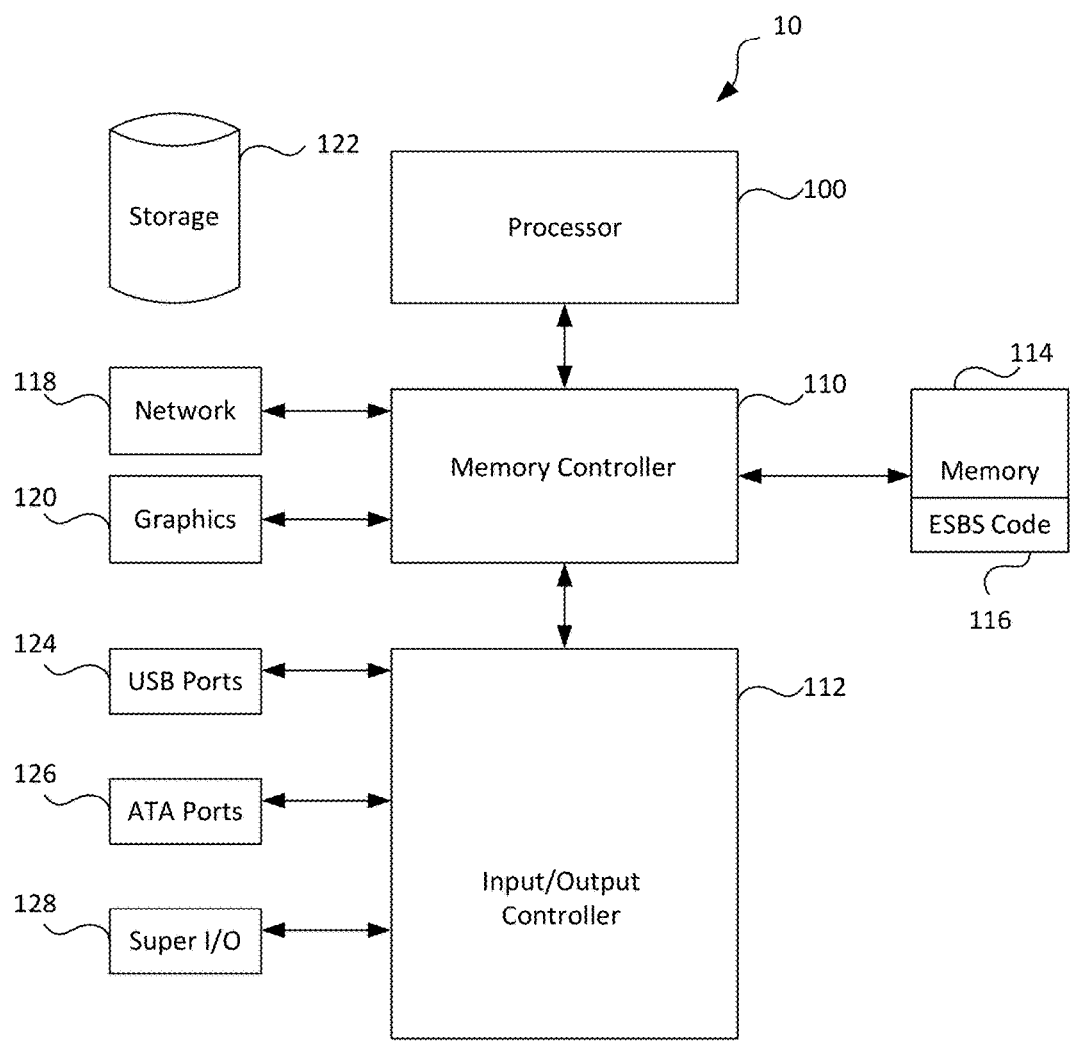
FIG. 1 is an example computer system implementing an ESB Sequencer (ESBS)
Figure 3:
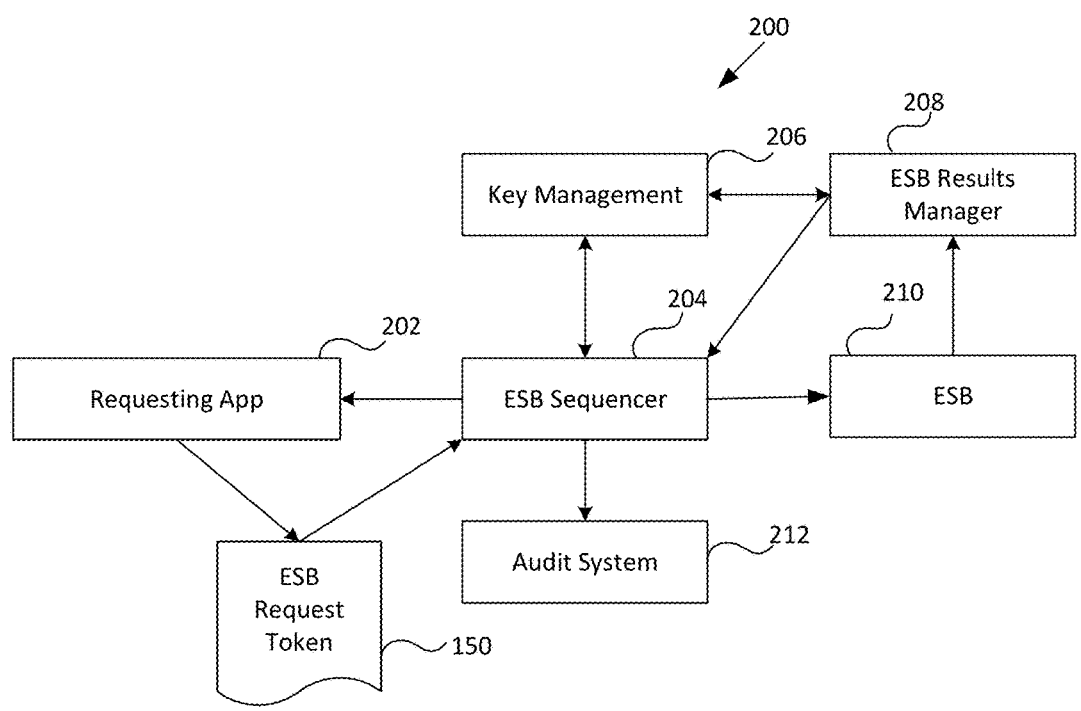
FIG. 3 is an example block diagram of various elements in use with an ESBS.

FIG. 1 is an example computer system 10 for implementing an enterprise service bus (ESB) Sequencer 204 (FIG. 3). A Processor 100 is connected to a memory controller 110 which is further connected to an Input/Output (I/O) controller 112. Memory controller 110 provides a high bandwidth and high speed interface to network 118, graphics 120, and non-transient computer readable memory 114 which includes instructions for performing tasks on processor 100, such as ESBS code 116.

I/O controller 112 provides several different input/output interfaces to allow processor 100 to retrieve or provide information. Several types of I/O interfaces are shown as non-limiting examples, such as Universal Serial Bus (USB) Ports 124, Asynchronous Transfer Attachment (ATA) Ports 126, and Super I/O 128 which provides conventional serial, parallel, and PS/2 interfaces. While memory controller 110 and I/O controller 112 are shown as two separate blocks, in some examples the blocks may be combined or alternatively broken into several different blocks. Storage 122 may be connected to computing device 10 in various possible fashions, such as with Network 118, ATA Ports 126, and USB ports 124. Storage 122 may include one or more copies of various objective lists, such as ESBS code 116, and ESBRT 150 (FIG. 2) scripts.

The ESBS code 116 and ESBRT 150 scripts may also be described in the general context of non-transitory computer code or machine-usable instructions, including computer-executable instructions such as program modules or logic, being executed by a computer or other computing machine, such as a personal data assistant or other handheld device. Generally, program modules including routines, programs, objects, components, data structures, etc., refer to code that performs particular tasks or implements particular abstract data types. The ESBS code 116 and ESBRT 150 scripts may be practiced in a variety of system configurations, including handheld devices, consumer electronics, general-purpose computers, more specialty computing devices, etc. They may also be practiced in distributed computing environments where tasks are performed by remote-processing devices that are linked through a communications network.

Computer-readable media (CRM) can be any available non-transitory media that can be accessed by computing device 10. Computer storage media 122 include both volatile and nonvolatile, removable and non-removable media implemented in any method or technology for storage of information such as computer-readable instructions, data structures, program modules, or other data. Communication media typically embody transitory computer-readable instructions, data structures, program modules, or other data in a modulated data signal such as a carrier wave or other transport mechanism and include any information delivery media. However, once received, stored, and used, the communication media becomes non-transitory.

Memory 114 includes computer-storage media in the form of volatile and/or nonvolatile memory, such as ESBS code 116. The memory may be removable, non-removable, or a combination thereof. Computing device 10 includes one or more processors 100 that read data from various entities such as memory 114 or I/O controller 112. Graphics(s) 120 present data indications to a user or other device. Example display components include a display device, speaker, printing component, vibrating component, etc.

Network 118 allows computing device 10 to communicate with other computing devices including datacenter or cloud-based servers through one or more intranet, Internet, private, custom, or other networking protocols whether using wireless, wired, optical, or other electromagnetic technique.

Figure 2:
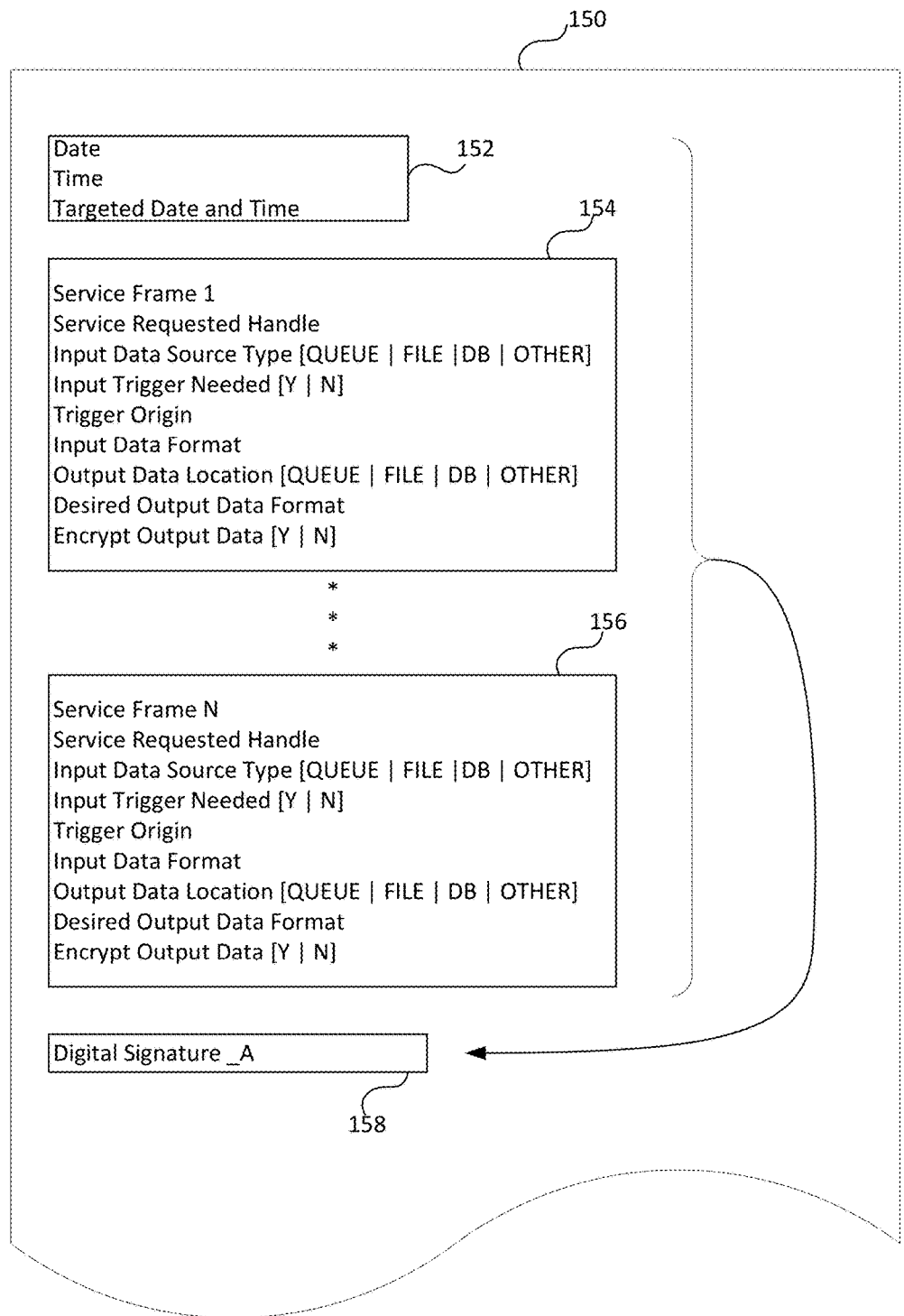
FIG. 2 is an example ESB Request Token implemented as a flat file.

FIG. 2 is an example ESB Request Token 150 implemented as a flat file. Alternatively, the ESBRT 150 could be implemented as a data structure, a spreadsheet file, or other electronic file. The ESBRT 150 includes several different sections to describe the desired ESB service requests. A temporal target instance section 152 includes the date and time that the ESBRT 150 was created. Also included is a requested target time or temporal target entry such as a "Targeted Complete by Date and Time" entry, for example, for when results from all the requested services need to or should be completed and the results delivered back to a calling or requesting application 202 (FIG. 3). The ESBRT 150 includes one or more Service Frames 154, 156 which specify the service requested from the ESB 210 (FIG. 3) along with designations for the input and output data source location and types, formats, and if input triggering is needed and its origin as well as whether the output data should be encrypted.

The start of each Service Frame begins with a Service Frame Identifier such as 1 for the first frame, 2 for the second, and incrementally so on to the last service frame N. Following the Service Frame Identifier is a Service Request Handle which is used to specify the particular ESB service requested from the ESB 210 for that respective Service Frame 154, 156. The input data to the ESB 210 can be designated and be one of several formats, from a temporary queue, a file, a database, or other format as needed by the requested ESB service. The Service Frame 154, 156 can specify if a trigger is needed to start the ESB requested service and if so, an origin for the trigger can be provided. The format of the input data can be provided along with the output data location and its format and whether it is to be encrypted for security purposes or not.

After each of the Service Frames 154, 156 have been completed, a final digital signature, Digital Signature_A 158 is created over the entire set of service frames and temporal target instance to ensure that the data provided in the ESBRT 150 is valid and uncorrupted.

FIG. 3 is an example block diagram of various elements in use with an ESBS 204. A requesting application 202 provides an ESBRT 150 to an ESBS 204. The ESBS uses a secure communication protocol such as TLS (although others could be used) so any sensitive data within the ESBRT 150 is protected in transit as well as the final ESB resultant dataset when it is returned to the calling requesting application 202. After receiving ESBRT 150, the ESBS 204 verifies that the Digital Signature_A 158 over the service frames is correct. Then the ESBS 204 parses each service frame in the ESBRT 150 to verify that the requested services and/or input and output data requested are valid and available from the ESB 210. Also, the ESBS 204 verifies that there are sufficient resources available, such as buffers and/or file space to store intermediate data results, to complete each of the service requests contained within the ESBRT 150. The ESBS 204 also ensures and confirms that the entire set of services requested by the ESBRT 150 can be completed by a "Targeted Complete by Date and Time" temporal target instance 152 in the ESBRT 150.

If input or output data is to encrypted or decrypted, the ESBS 204 can call a Key Management Service 206 to access the appropriate symmetric cryptographic keys or public/private asymmetric cryptographic keys as needed for verification of any digital signatures or digital certificates.

The ESBS 204 calls the ESB 210 for each of the service frames 154, 156 and uses the ESB Results Manager 208 to store any intermediate and final results, encrypted if requested. The ESB Results Manager 208 may utilize any storage 122 as noted in FIG. 1. Typically the first Service Frame 154 will require that data be obtained from a flat file, database, or application. Thereafter, input data is likely to be the output of a prior ESB 210 service call. Thus, once the ESB 210 completes the requested service function, the ESBS 204 should preserve the output data state in order to call the next desired service as specified in the ESBSRT 150. The output data from the ESB 210 will be independently maintained by the ESB Results Manager 208

Along with storing the intermediate and final results in ESB Results Manager, an independent Audit System 212 can also be used to store ESBRT Files 150, the Service Frames 154, 156, and the respective results or any ESBS activity to be used for debugging, forensic failure analysis, historical tracking, financial billing, and so forth.

Figure 4:
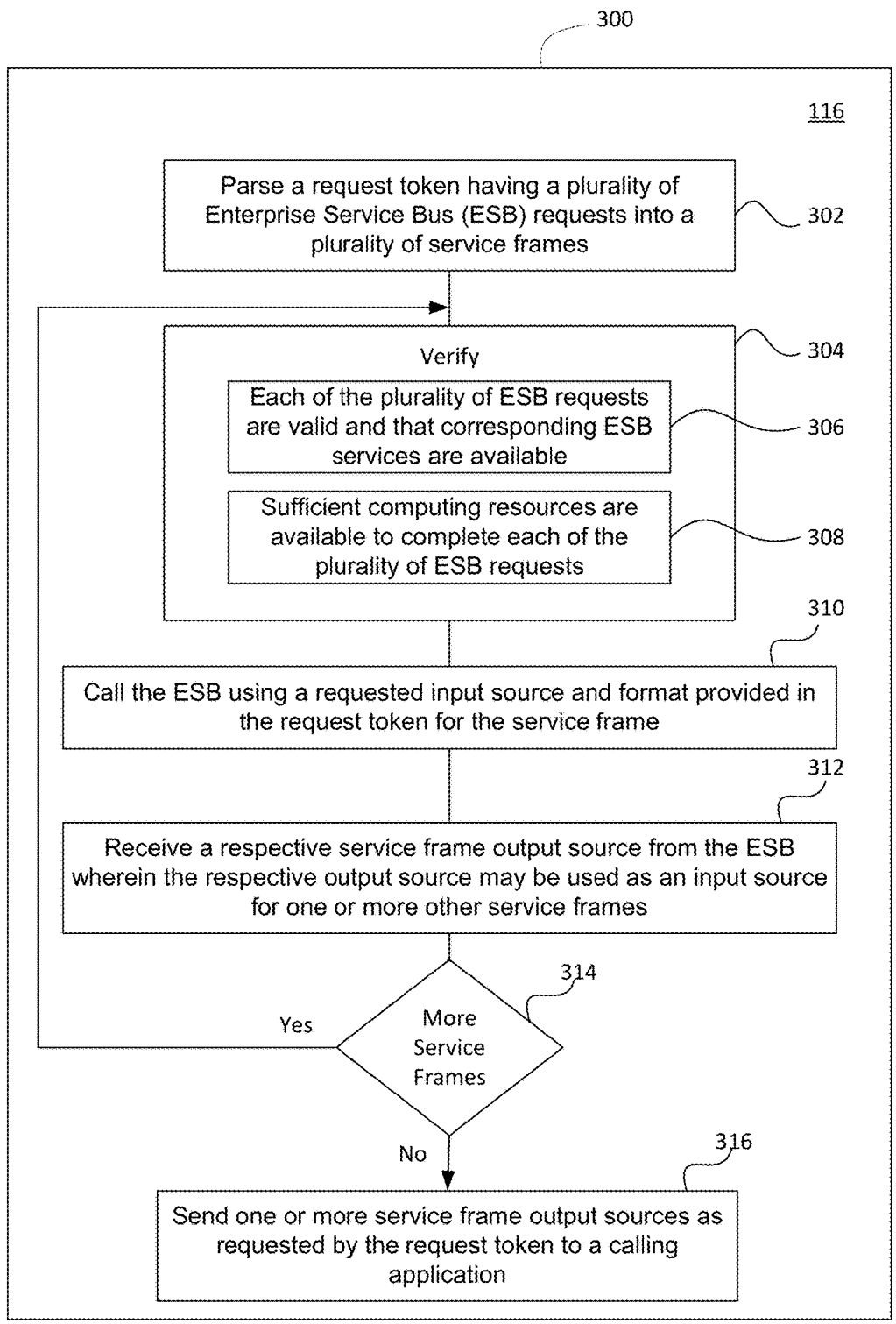
FIG. 4 is an example computer readable medium with instructions to implement an ESBS.

FIG. 4 is an example CRM 300 with ESB code 116 with instructions to implement ESBS 204. In block 302, instructions parse an ESB request token 150 that has a plurality of ESB requests into a plurality of service frames 154,156. For each service frame, in block 304 various verification instructions ensure that the ESB request token 150 is proper. For instance, in block 306 there are instructions to verify that each of the plurality of ESB requests 154, 156 are valid and that corresponding ESB services are available at the ESB 210. In block 308, additional instructions are used to verify that sufficient computing resources are available at the ESB 210 to ensure that each of the plurality of ESB requests can be completed. In block 310, the ESB 210 is called using a requested input source and format provided in the ESB request token 150 for the service frame 154, 156. A respective service frame output is received using instructions in block 312 from the ESB 210 where the respective output source may be used as an input source for one or more other service frames. In decision block 314, the instructions check to see if there are more service frames 154, 156 to process and if so the instructions direct the CPU to continue processing at block 304. If there are not any more service frames 154, 156 the in block 316 the instructions send one or more service frame output sources as requested by the ESB request token 150 to a calling application, such as requesting app 202. In addition, there can be additional instructions to implement other features of the ESB Sequencer 204 as desired.

Figure 5:
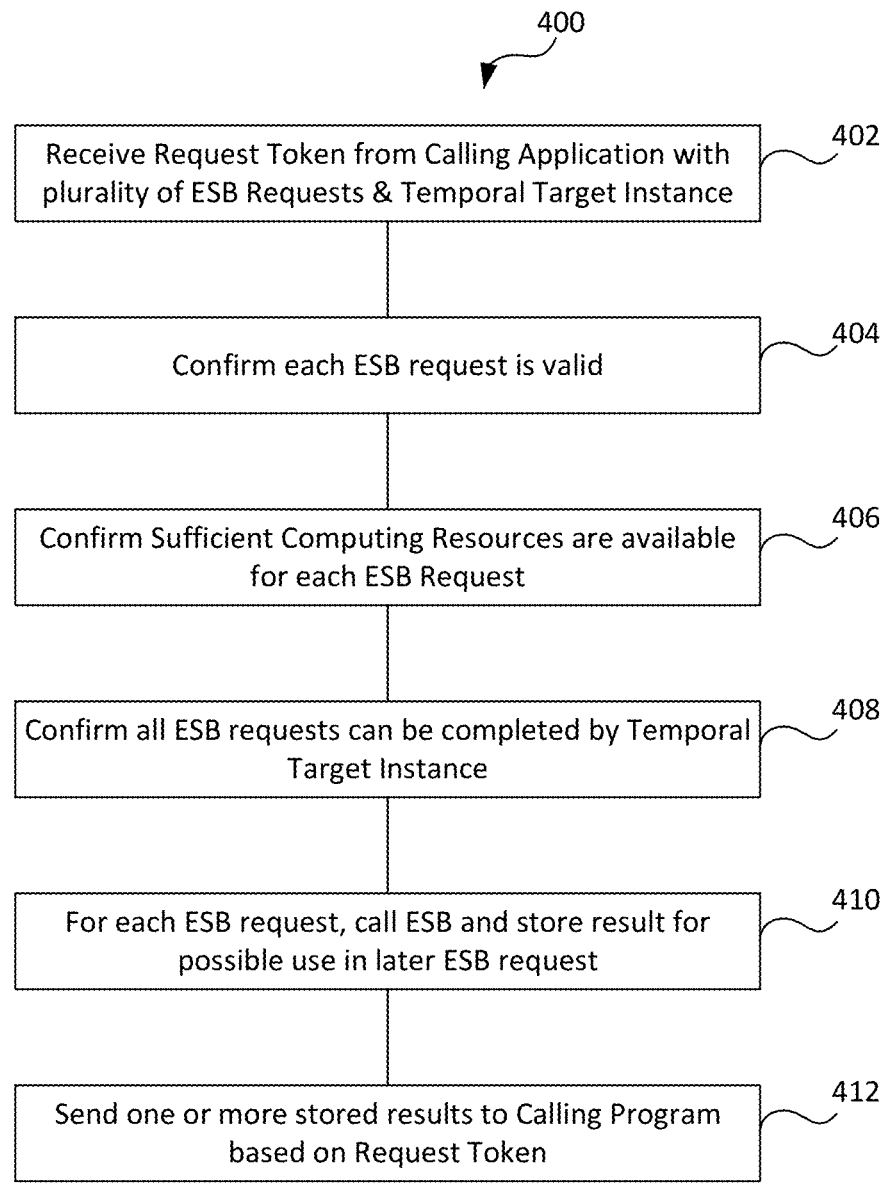
FIG. 5 is an example flow chart of steps implemented by the ESBS.

FIG. 5 is an example flow chart 400 that summarizes various possible steps implemented by the ESBS 204. In block 402, the ESBS 204 receives an ESBRT 150 from a calling application 202. The ESBRT 150 includes a plurality of ESB Service Frame 154, 156 requests along with a temporal target instance 152. The ESBS 204 confirms that each ESB Service Frame 154, 156 requests are valid in block 404. Then in block 406, the ESBS 204 confirms that there are sufficient resources available from the ESB 210 for each of the ESB Service Frame 154, 156 requests. In block 408, the ESBS 204 also confirms that all ESB requests can be completed by the "Targeted Complete by Date and Time" temporal target instance 152 in the ESBRT 150. If there are sufficient resources available and the ESB requests can all be completed in time, then in block 410 each ESB request is used by the ESBS 204 to call the ESB 210 using the requested input/output data types, formats and locations and storing the results for use in a later ESB request or for forwarding on to the calling program or requesting application 202 as requested in the ESBRT 150 in block 412.

Figure 6:
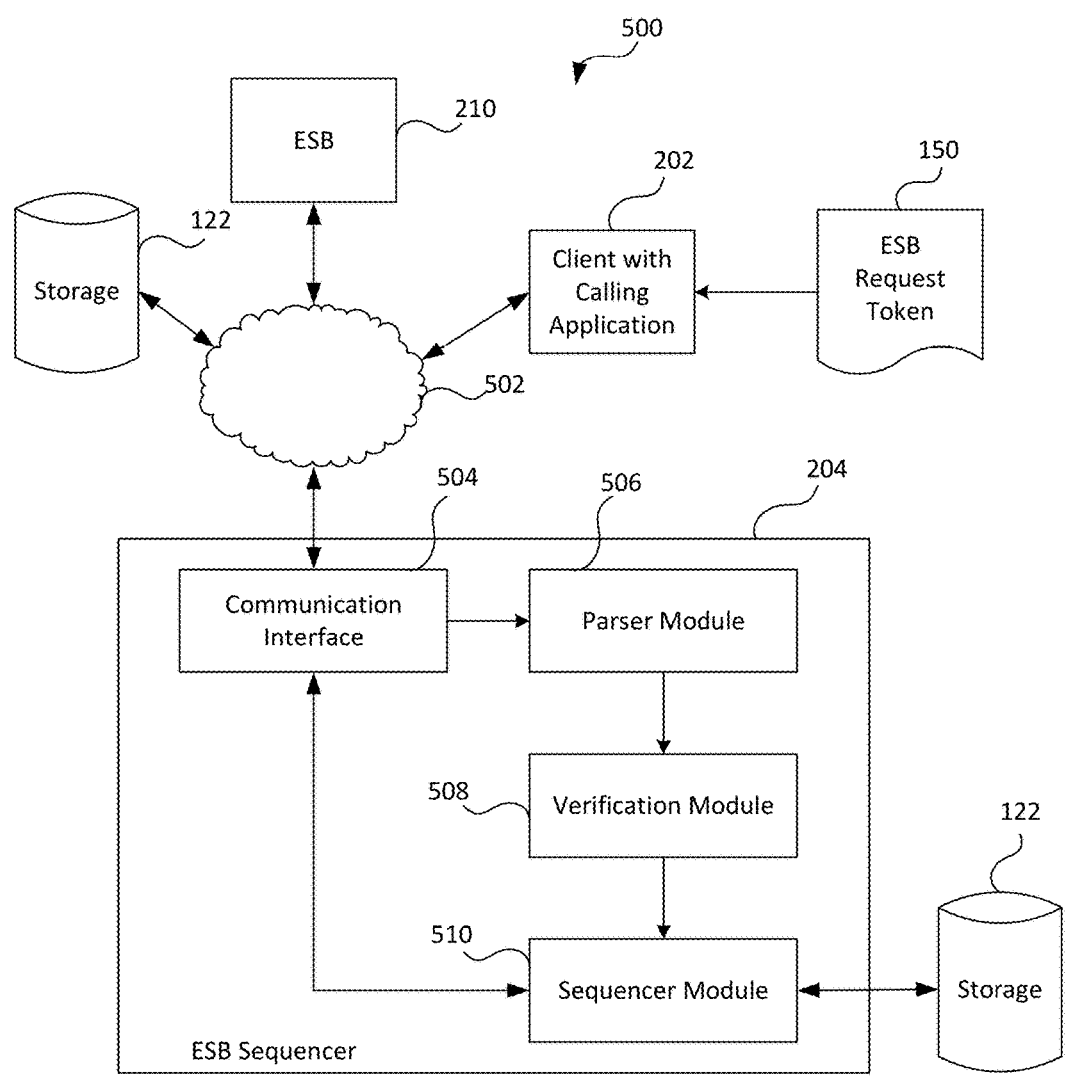
FIG. 6 is an example block diagram of one implementation of an ESBS and its interaction with other elements.

FIG. 6 is an example block diagram 500 of one implementation of an ESBS 204 and its interaction with other elements of an ESB system. The ESBS 204 includes a Communication interface 504 for communicating over an intranet, Internet, private or public cloud or other network 502 to receive the ESBRT 150 from a computing client 202 with a calling application to the ESBS 204. The Communication interface 504 also allows the ESBS 204 to send and receive data and commands to the ESB 210. The ESBS 204 also includes a Parser Module 506 and a Verification Module 508 as well as a Sequencer Module 510. The ESBS 204 may include one or more storage units 122 locally or connected to network 502. The Parser Module 506 is used to parse the ESBRT 150 into a plurality of Service Frames and a targeted-complete-by temporal target instance 152. The Verification Module 508 confirms that each of the plurality of ESB requests are valid and available at ESB 210, that sufficient computing resources are available to complete each of the requests, and that the entire plurality of the ESB requests can be completed by the temporal target instance stated date and/or time, if present. The Sequencer Module 510 calls the ESB 210 for each of the plurality of service frames using a requested input source and a format provided in the ESBRT 150 for the respective service frame. The Sequencer Module 510 also receives the output source from the ESB 210 and stores the output source in any of storage 122 for use as an input source for one or more subsequent service frames. The Communication interface 504 can be used by the Sequencer Module 510 to send one or more service frame output sources to the calling application 202 as requested by the ESBRT 150. The ESBS 204 may also include a Tracking and Monitoring module to communicate the current state of the Sequencer Module 510 calls to the ESB 210 based on the ESBRT 150.

The ESBS 204 offers additional functionality not found in traditional ESBs for managing and securing file based input. It provides the capability of minimizing exposure time of unencrypted ESB application data by utilizing OS services an ESB host application is running on to identify when an output file has been closed and ready for reading. As soon as the output file is closed, the ESBS 204 will read the file, encrypt the data, place it in a queue, and delete the output file. This set of actions minimizes the potential for sensitive data exposure.

When input data is to be placed unencrypted in a file because an ESB application cannot read encrypted data, the ESBS 204 can immediately delete the file once it detects the ESB application has read in all the data in the input file. These set of actions also absolutely minimizes the amount of time any unencrypted data in the input file is exposed.

The ESBS 204 also provides for the capability of sending a trigger or other startup enabling signal to ESB application(s) to produce on demand file based output or to initiate file based input. Further, at any given time, the ESBS 204 can be queried to ascertain the current service frame in the ESBRT 150 that is being processed. The ESBS 204 maintains that service frame information as a constant state variable to allow for monitoring progress.

While the present claimed subject matter has been particularly shown and described with reference to the foregoing preferred and alternative examples, those skilled in the art will understand that many variations may be made therein without departing from the spirit and scope of the claimed subject matter as defined in the following claims. This description of the claimed subject matter should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method to process a sequence of Enterprise Service Bus (ESB) requests for an ESB, comprising:
   receiving from a calling application a request token that includes a plurality of ESB requests parsable into multiple service frames and a temporal target instance;
   verifying the request token by:
      confirming that each the plurality of ESB requests are valid and corresponding services available;
      confirming that sufficient computing resources are available to complete each the plurality of ESB requests; and
      confirming the entire plurality of ESB requests can be completed by the temporal target instance, if present;
   for each of the multiple service frames, calling the ESB using a requested input source and format specified in the request token for the service frame, receiving an output source from the ESB, and storing the output source from the ESB in a requested format wherein the output source stored may be used as an input source for one or more other service frames; and
   sending one or more service frame output sources as requested by the request token to the calling application.

2. The method of claim 1 wherein the step of verifying the request token comprises validating over the set of multiple service frames a digital signature.

3. The method of claim 1 wherein storing the output source from the ESB comprises storing the result output source in an independent ESB result manager to protect the output source to allow it to be securely propagated forward as an input source to a subsequent service frame.

4. The method of claim 1 further comprising the step of logging the request token, the ESB requests and their respective input sources and output sources in an ESB Audit system.

5. The method of claim 1 further comprising the step of providing tracking and monitoring of the plurality of ESB requests based on the request token.

6. An Enterprise Service Bus (ESB) Sequencer to process a sequence of ESB requests for an ESB, comprising:
   at least one processor;
   a communication interface to receive a request token from a calling application that includes a plurality of ESB requests;

a parser module comprising instructions executable by the at least one processor to parse the request token into a plurality of service frames and a temporal target instance, if present;

a verification module comprising instructions executable by the at least one processor to: confirm a) each of the plurality of ESB requests are valid and corresponding services available, b) sufficient computing resources are available to complete each of the plurality of ESB requests, and c) if present, that the entire plurality of ESB request can be completed by the temporal target instance; and a sequencer module comprising instructions executable by the at least one processor to: a) call the ESB for each of the plurality of service frames using a requested input source and format provided in the request token for the service frame, b) receive an output source from the ESB, and c) store the output source, wherein the output source may be used as an input source for one or more other service frames and wherein the communication interface is to send one or more service frame output sources as requested by the request token to the calling application.

7. The system of claim 6, wherein the verification module is also executable by the at least one processor to validate over the plurality of service frames a digital signature.

8. The system of claim 6 further comprising an ESB result manager to protect the output source to allow it to be securely propagated forward as an input source to a subsequent service frame.

9. The system of claim 6 further comprising an ESB audit system to log the request token, the ESB requests and their respective input sources and output sources.

10. The system of claim 6 further comprising a tracking and monitoring module comprising instructions executable by the at least one processor to communicate the current state of the sequence module calls to the ESB based on the request token.

11. A non-transitory computer readable memory (CRM) comprising instructions executable by a processor to:

parse a request token having a plurality of Enterprise Service Bus (ESB) requests into a plurality of service frames;

for each service frame:
  verify that a) each of the plurality of ESB requests are valid and that corresponding ESB services are available, and b) sufficient computing resources are available to complete each of the plurality of ESB requests;

call the ESB using a requested input source and format provided in the request token for the service frame;

receive a respective service frame output source from the ESB wherein the respective output source may be used as an input source for one or more other service frames; and send one or more service frame output sources as requested by the request token to a calling application.

12. The CRM of claim 11 wherein the instructions are also executable to validate a digital signature over the plurality of service frames.

13. The CRM of claim 11 wherein the instructions are also executable to send to an ESB result manager the respective output source to protect it and allow it to be securely propagated forward as an input source to a subsequent service frame.

14. The CRM of claim 11 wherein the instructions are also executable to log the request token, the ESB requests and their respective input sources and respective output sources to an ESB audit system.

15. The CRM of claim 11 wherein the instructions are also executable to confirm that the entire plurality of ESB request can be completed by a temporal target instance, if present.

* * * * *